US012651150B1

(12) United States Patent
Singh

(10) Patent No.: US 12,651,150 B1
(45) Date of Patent: Jun. 9, 2026

(54) SYSTEM ON CHIP FOR ARTIFICIAL INTELLIGENCE APPLICATIONS

(71) Applicant: Ambient Scientific, Inc., San Jose, CA (US)

(72) Inventor: Gajendra Prasad Singh, San Jose, CA (US)

( * ) Notice: Subject to any disclaimer, the term of this patent is extended or adjusted under 35 U.S.C. 154(b) by 1114 days.

(21) Appl. No.: 17/511,372

(22) Filed: Oct. 26, 2021

Related U.S. Application Data

(60) Provisional application No. 63/106,051, filed on Oct. 27, 2020.

(51) Int. Cl.
*G06N 3/063* (2023.01)
*G06F 17/16* (2006.01)

(52) U.S. Cl.
CPC ............. *G06N 3/063* (2013.01); *G06F 17/16* (2013.01)

(58) Field of Classification Search
CPC ............. G06F 15/7821; G06F 15/7842; G06F 15/7889; G06F 15/7892; G06F 17/16; G06F 9/3001; G06F 9/30007; G06F 9/30065; G06F 9/3893; G06F 15/80;

G06F 15/8007; G06F 15/8023; G06F 15/8053; G06F 15/8092; G06N 3/0464; G06N 3/04; G06N 3/063
See application file for complete search history.

(56) References Cited

U.S. PATENT DOCUMENTS

2019/0043560 A1* 2/2019 Sumbul ................. G11C 11/419
2019/0129719 A1* 5/2019 Bainville ................ G06F 17/16
2021/0240443 A1* 8/2021 Chang ................... G11C 13/004
2022/0012303 A1* 1/2022 Zheng ..................... G06F 17/16

* cited by examiner

*Primary Examiner* — Andrew Caldwell
*Assistant Examiner* — Phat N Le

(57) ABSTRACT

A system on chip for artificial intelligence applications and methods for using the same are provided. In one embodiment, a neural network computation engine may include a controller that configures an operand memory storing input vectors and weight vectors based on structure and characteristics of the neural network. The controller may fetch an input vector comprising a row of operands of an input matrix with one instruction. Similarly, the controller may fetch a weight vector comprising a column of operands of a weight matrix with one instruction. The controller is further configured to control one or more computation matrix circuits to generate outputs of the neural network using the fetched input vectors and weight vectors.

4 Claims, 8 Drawing Sheets

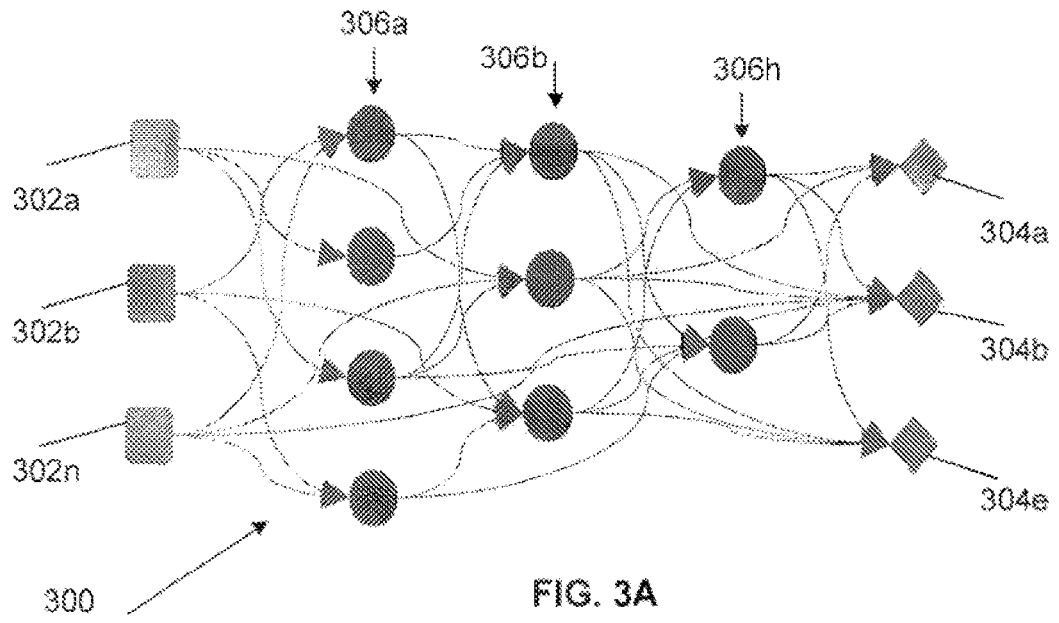
FIG. 3A
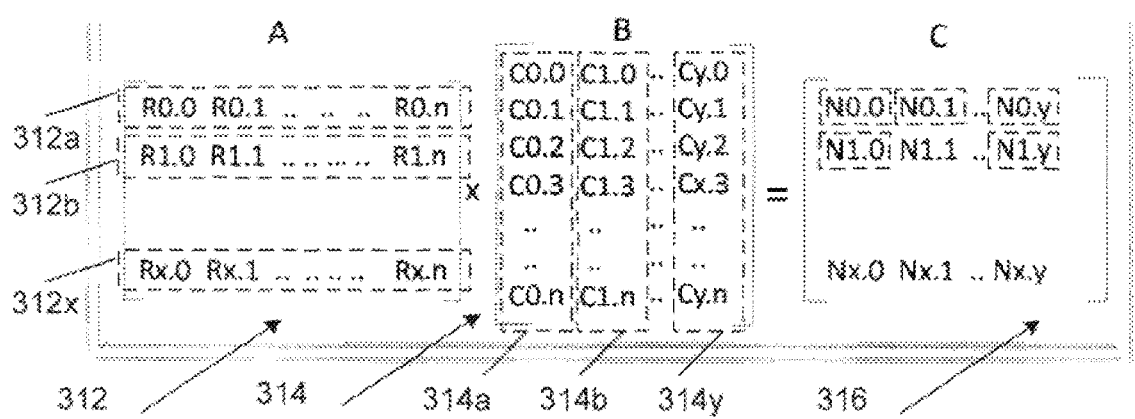
FIG. 3B
$$\begin{bmatrix} R0 & R1 & .. & Rn \end{bmatrix} \times \begin{bmatrix} C0.0 & C1.0 & & Cx.0 \\ C0.1 & C1.1 & & Cx.1 \\ .. & .. & & .. \\ C0.n & C1.n & & Cx.n \end{bmatrix} = \begin{bmatrix} N0 & N1 & .. & Nx \end{bmatrix}$$
FIG. 3C

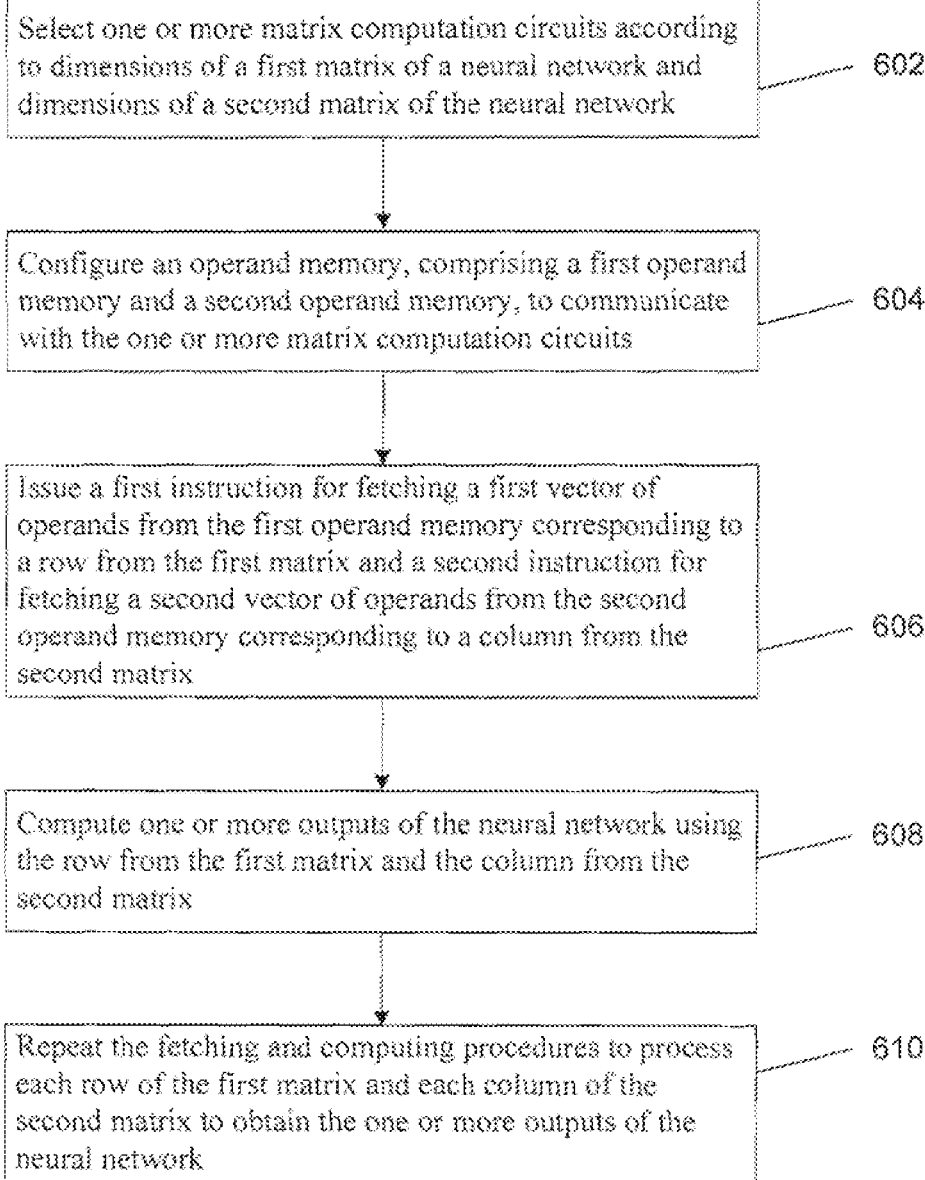

Select one or more matrix computation circuits according to dimensions of a first matrix of a neural network and dimensions of a second matrix of the neural network — 602

Configure an operand memory, comprising a first operand memory and a second operand memory, to communicate with the one or more matrix computation circuits — 604

Issue a first instruction for fetching a first vector of operands from the first operand memory corresponding to a row from the first matrix and a second instruction for fetching a second vector of operands from the second operand memory corresponding to a column from the second matrix — 606

Compute one or more outputs of the neural network using the row from the first matrix and the column from the second matrix — 608

Repeat the fetching and computing procedures to process each row of the first matrix and each column of the second matrix to obtain the one or more outputs of the neural network — 610

FIG. 6

SYSTEM ON CHIP FOR ARTIFICIAL INTELLIGENCE APPLICATIONS

CROSS-REFERENCE TO RELATED APPLICATIONS

This application claims the benefit of U.S. provisional patent application No. 63/106,051, "A System on Chip for Artificial Intelligence Applications," filed Oct. 27, 2020. The aforementioned United States patent application is assigned to the assignee hereof and is hereby incorporated by reference in its entirety.

FIELD

The present invention relates to the field of artificial intelligence. In particular, the present invention relates to a system on chip for artificial intelligence applications and methods for using the same.

BACKGROUND

In a conventional method, to compute Matrix A (32, 32)×Matrix B (32×32)=Matrix C (32×32), the computation would use 32,768 multiplies, 32,768 adds, and 65,536 SRAM read operations. In a standard single-issue single core CPU with built in MAC function (1 cycle/operation). The above operations would take 98,304 cycles.

Therefore, it is desirable to have a system on chip for artificial intelligence applications and methods for using the same in order to improve the speed and efficiency of the above conventional computation methods.

SUMMARY

The present disclosure provides a system on chip for artificial intelligence applications and methods for using the same. In one embodiment, a method of performing neural network computation may include selecting, by a controller, one or more matrix computation circuits according to dimensions of a first matrix of a neural network and dimensions of a second matrix of the neural network; and configuring, by the controller, configuring an operand memory, comprising a first operand memory and a second operand memory, by the controller, to communicate with the one or more matrix computation circuits. The method further includes issuing, by the controller, a first instruction for fetching a first vector of operands from the first operand memory corresponding to a row from the first matrix and a second instruction for fetching a second vector of operands from the second operand memory corresponding to a column from the second matrix; computing, by the one or more matrix computation circuits, one or more outputs of the neural network using the row from the first matrix and the column from the second matrix; and repeating, by the controller, the fetching and computing procedures to process each row of the first matrix and each column of the second matrix to obtain the one or more outputs of the neural network.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the specification.

FIG. 3A illustrates an exemplary neural network according to aspects of the present disclosure.

FIG. 3B illustrates an exemplary matrix computation for the neural network of FIG. 3A according to aspects of the present disclosure.

FIG. 3C illustrates an exemplary implementation of performing matrix computation of one row and multiple columns according to aspects of the present disclosure.

FIG. 6 illustrates an exemplary method of performing neural network computation according to aspects of the present disclosure.

DESCRIPTION OF EMBODIMENTS

A system on chip for artificial intelligence applications and methods for using the same are provided. The following descriptions are presented to enable a person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Figure 1:
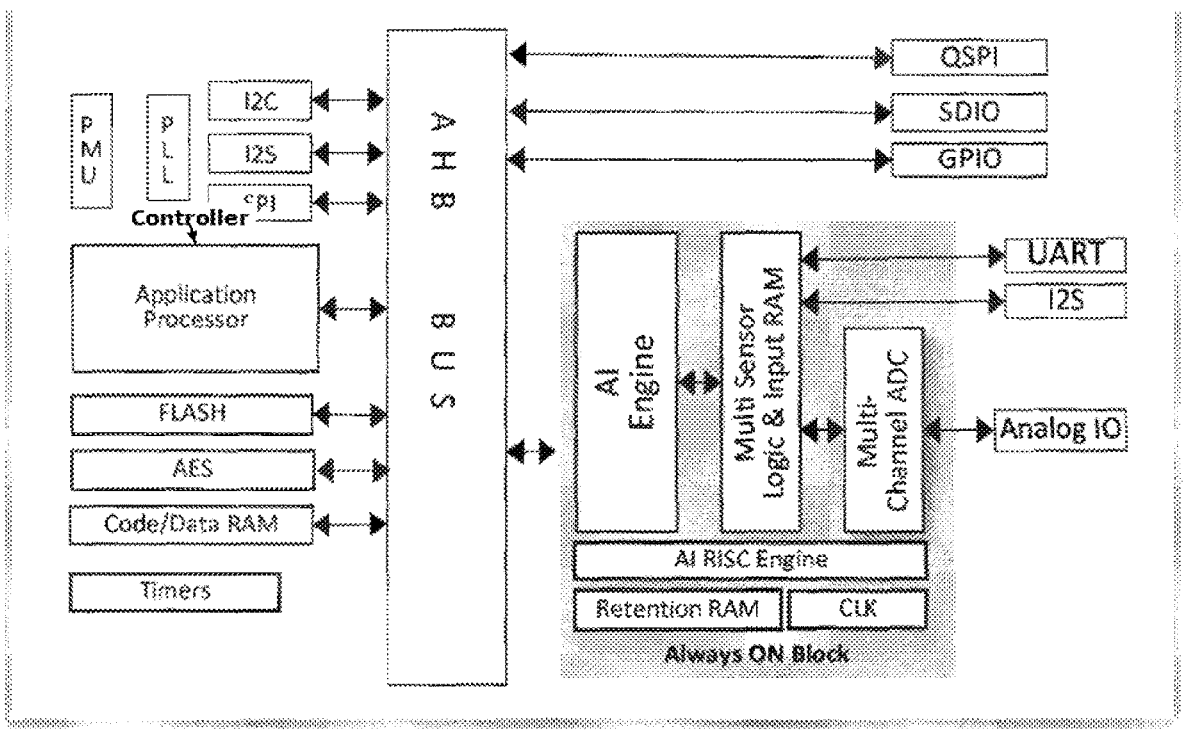
FIG. 1 illustrates an exemplary implementation of a system on chip for artificial intelligence application according to aspects of the present disclosure.

FIG. 1 illustrates an exemplary implementation of a system on chip for artificial intelligence application according to aspects of the present disclosure. In some implementations, the system on chip (SoC) for artificial intelligence (AI) application may be divided into three logical sections: 1) AlwaysON inference; 2) Extended AI block; and 3) Application processor subsystem. The AlwaysON block can be designed to be self-sufficient. It can include required components to run inference around the clock while the rest of the system may be powered off. The AI cores can be configured to wake up in stages as required. Additional AI cores may be added for applications where enhanced performance is needed. Each AI core can be enabled, disabled or halted dynamically, for example via software control and definition.

According to aspects of the present disclosure, the SoC may employ advanced power gating, where rest of the chip is powered down for normal inference operation, except the AlwaysOn block. In advance power gating, the SoC may wake up in stages when needed, and the application processor may wake up only to execute user application(s).

Moreover, the SoC may employ a system clock that may be designed to support a wide range of applications. For example, clock source and frequency can be changed by application at run time without halting operation. The SoC can be configured to support multiple TURBO performance modes, as well as a wide frequency range such as from sub 1 KHz to 100 MHz. The phase lock loop (PLL) may be powered down @<20 MHz or certain predetermined frequency operation. The clock design may also support highly granular clock gating. In addition, clock may be designed for asynchronous data exchange where dataflow may be used to guide power consumption. These functional characteristics enable the SoC to support AI applications such as inference and training at edge devices, as well as provide an application processor subsystem for non-AI applications.

Figure 2:
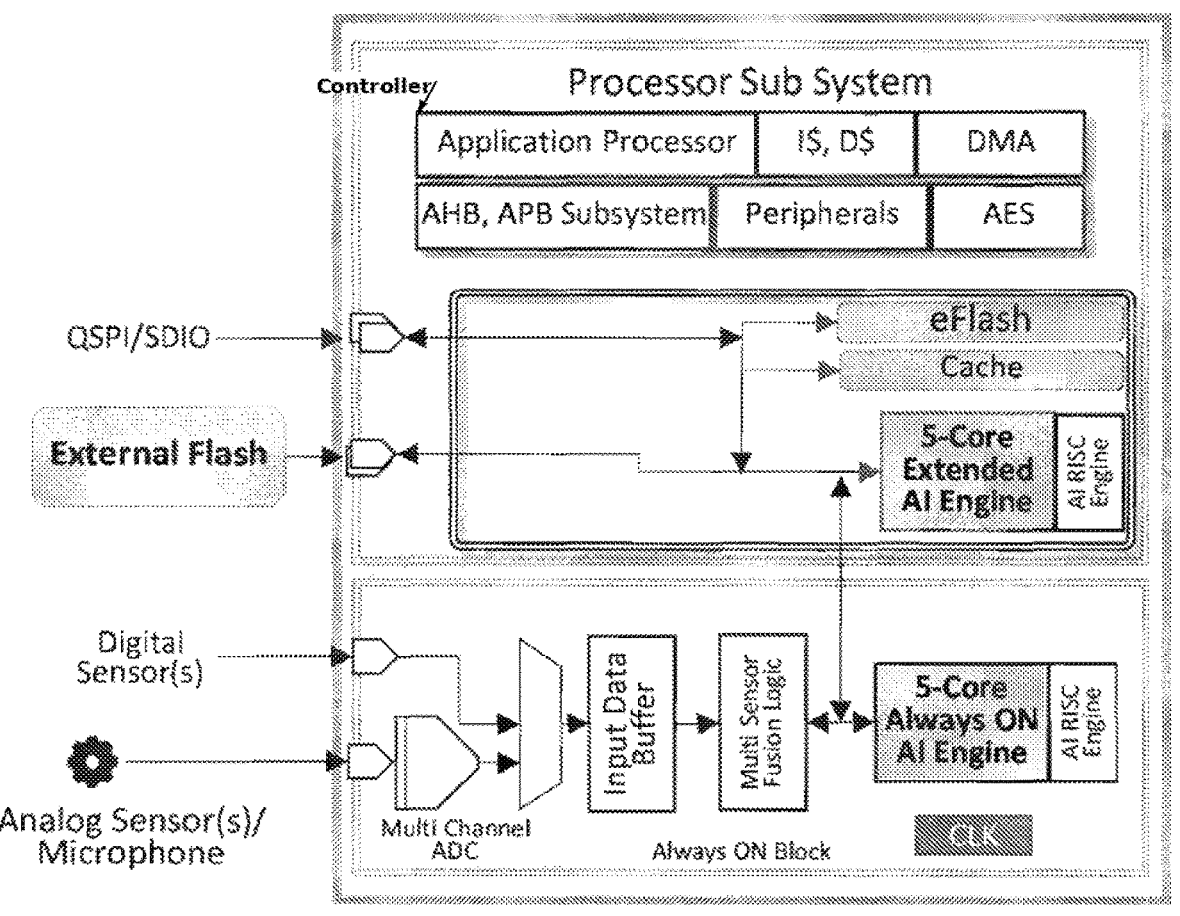
FIG. 2 illustrates another exemplary implementation of a system on chip for artificial intelligence application according to aspects of the present disclosure.

FIG. 2 illustrates another exemplary implementation of a system on chip for artificial intelligence application according to aspects of the present disclosure. In some implementations, the SoC for artificial intelligence application may be configured to enable real life, AlwaysON AI applications in edge devices, with low power consumption and at affordable cost. It can function as an integrated AI computer for AlwaysON inference, and in some applications for total system power<100 uW. The SoC is designed to consume less power during both normal and AI operations.

According to aspects of the present disclosure, the SoC can support AI applications such as AlwaysON keyword spotting, anomaly detection, sensor-fusion inference, etc. In addition, it can be configured to support sensor fusion of up to 8 sensors independently or simultaneously. It can further be configured to support variable sample rate analog to digital converters (ADC), for example 10 SPS to IMSPS, as well as low power clock generator. The SoC may include an application processor, which can be active only during user applications. In terms of power consumption, the SoC can be configured to reduce power consumption using an AlwaysON inference, which may consume about 80 uW by running keyword spotting ASR using GRU NN at audio sample @ 20 KSPS. The application processor may be configured to be not active during inference.

FIG. 3A illustrates an exemplary neural network according to aspects of the present disclosure. In the example shown in FIG. 3A, the neural network 300 may receive a plurality of inputs, labelled as 302a through 302n. The neural network 300 may produce one or more outputs, labelled as 304a through 304e. The structure of the neural network 300 may include a plurality of neurons, where each neuron is represented as a circle. The neurons are arranged in a plurality of layers, labelled as 306a through 306h. Each neuron represents a set of computations based on the external or internal inputs from a previous layer and the weight assigned to each external or internal input. The weight of each connection may be predetermined by training or inference. The output of each neuron may be propagated or distributed to other neurons in subsequent layers of the neuron network.

FIG. 3B illustrates an exemplary matrix computation for the neural network of FIG. 3A according to aspects of the present disclosure. In a conventional method, to compute Matrix A (32, 32)×Matrix B (32×32)=Matrix C (32×32), the computation would use 32,768 multiplies, 32,768 adds, and 65,536 SRAM read operations. In a standard single-issue single core CPU with built in MAC function (1 cycle/operation). The above operations would take 98,304 cycles. Using the techniques of the present disclosure, the above computation can be reduced to 128 cycles, which results in a 768 times reduction in clock frequency and cycle count.

As shown in FIG. 3B, the external or internal inputs of the neural network 300 may be represented by matrix 312. Similarly, the weights of the neural network 300 may be represented by matrix 314. The output of the neural network 300 may be represented by matrix 316. According to aspects of the present disclosure, matrix 312 may include a plurality of input vectors, labelled as 312a, 312b, through 312x. Matrix 314 may include a plurality of weight vectors, labelled as 314a, 314b, through 314y. In matrix 316, each output is computed by a cross multiplication of in input vector, such as a row in matrix 312, by a weight vector, such as a column in matrix 314.

For example, the value of N0.0 is computed by the expression R0.0×C0.0+R0.1×C0.1+ . . . +R0.n×C0.n; the value of N0.1 is computed by the expression R0.0×C1.0+R0.1×C1.1+ . . . +R0.n×C1.n; and the value of N0.y is computed by the expression R0.0×Cy.0+R0.1×Cy.1+ . . . +R0.n×Cy.n.

After processing the first row of input vectors 312a of matrix 312 with respect to each column of weight vectors of matrix 314, the computation is continued with the second row of inputs vectors 312b of matrix 312 with respect to each column of weight vectors of matrix 314. For example the value of N1.0 is computed by the expression R1.0×C0.0+R1.1×C0.1+ . . . . R1.n×C0.n. Each row of input vectors are processed in the same manner until all vectors of matrix 312 and matrix 314 are processed. For example, the value of Nx.y is computed by the expression of Rx.0×Cy.0+Rx.1×Cy.1+ . . . +Rx.n×Cy.n.

According to aspects of the present disclosure, by configuring a neural network computation engine to process a vector of input operands and a vector of weight operands at a time, the number of processor instructions can be significantly reduced, which in turn improves performance and at the same time reduces power consumption for the neural network computation engine. In addition, by configuring the neural network computation engine to process a plurality of multiplications and the summation after the multiplications in parallel, the performance of the neural network computation engine can be improved substantially.

FIG. 3C illustrates an exemplary implementation of performing matrix computation of one row and multiple columns according to aspects of the present disclosure. Note that the matrix computation of one row of the first matrix and all columns of the second matrix is performed in one cycle to produce the output matrix.

Figure 4A:
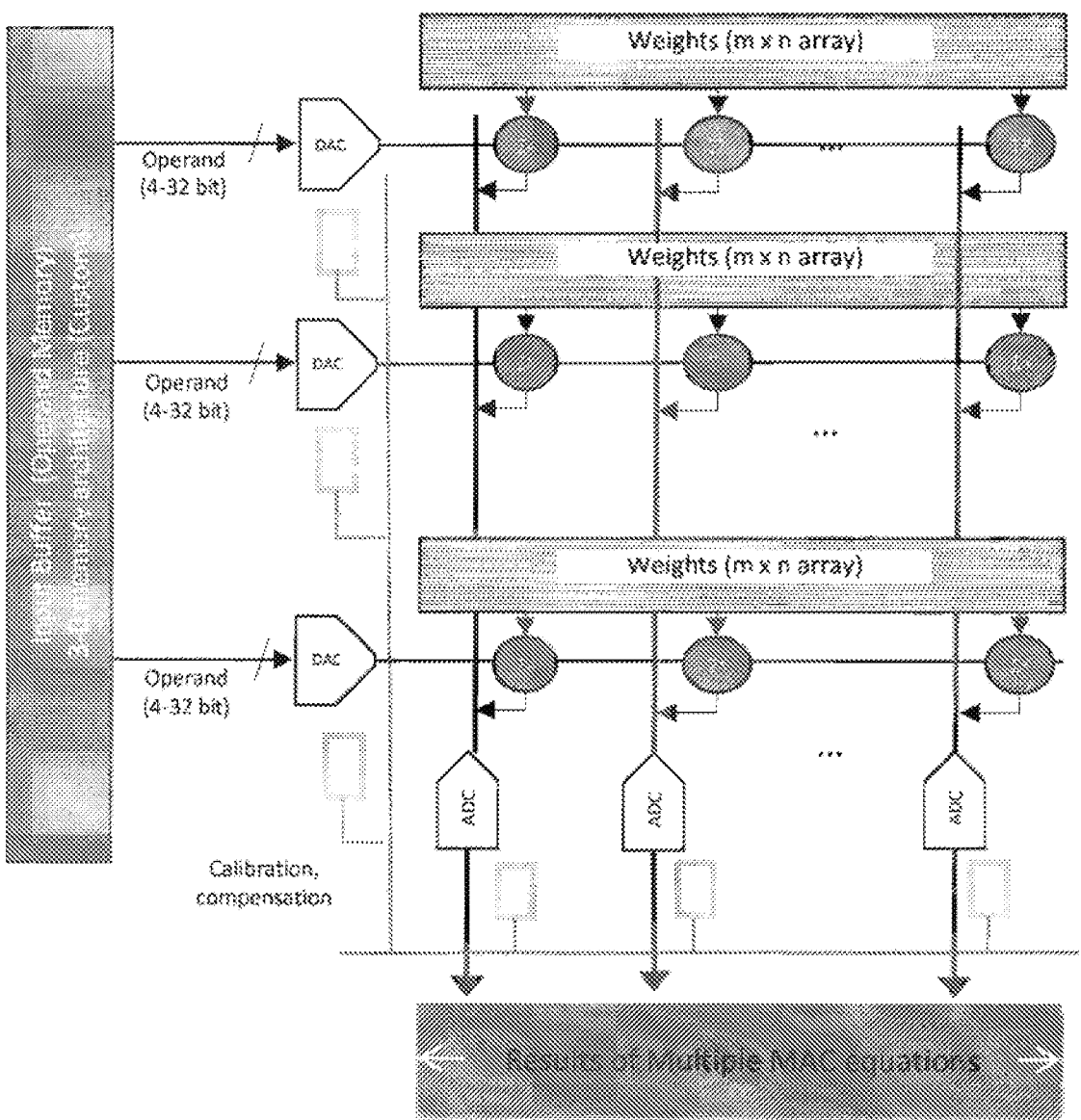
FIG. 4A illustrates an exemplary implementation of a matrix computation engine according to aspects of the present disclosure.

FIG. 4A illustrates an exemplary implementation of a matrix computation engine according to aspects of the present disclosure. In the exemplary implementation shown in FIG. 4A, a row in the input matrix may include 32 operands (n=32), and a column in the weight matrix may include 8 operands (x=8), which results in a matrix computation engine of 256 multiplication-accumulates per cycle per core (MAC/Cycle/Core). Note that inputs to the matrix computation engine can be in digital format, and outputs of the matrix computation engine may also be in digital format, while the matrix computation can be performed using analog techniques.

In some implementations, only CMOS transistors are used in performing analog functions, and there is no use of resistors, inductors, and capacitors in performing the analog functions. One of the benefits of using both digital and analog technologies is that there is no limitation in scaling the SoC to smaller geometries as semiconductor processing technology progresses. Analog MAC can be computed in a SRAM-like custom circuit structure that stores weight operands and performs MAC operations in the same structure. Instructions and weight operands can be paged at run time without interrupting AI operation. For writing new instructions and weights, the circuit behaves like a normal SRAM.

According to aspects of the present disclosure, usage and resolution of operands can be flexible via software definition. Both input operands and weight operands may have 4-bit, 8-bit, 16-bit, or 32-bit resolutions. In addition, operand resolution may change dynamically and independently by application software for each core.

In the exemplary implementation of FIG. 4A, DAC and ADC are configured to support 4-bit, 8-bit, 16-bit, 32-bit resolutions. The Analog components can produce accurate results without approximation. In one approach, the DACs can be configured to convert input operands and weight operands to analog variables. One of the DACs can be configured to convert digits to current and the other DAC can be configured to convert digits to conductance. Summation may be done by adding currents. The analog MAC uses Kirchhoff's to perform the multiplication in analog. Summation can be performed by using via between metal wires. The ADCs are configured to convert voltage (MAC results) back to binary digits. Analog layout and isolation techniques are employed to isolate noise from digital circuits.

According to aspects of the present disclosure, the SoC is further configured to address variations, noise and reliability issues through techniques of matching, biasing, calibration, compensation, etc. For example calibration may run at boot time. Calibration normally may take less time than PLL lock. In some implementations, each AI core may be calibrated independently. In other implementations, free running adaptive compensations may be employed to address temperature variations without interrupting operation.

Figure 4B:
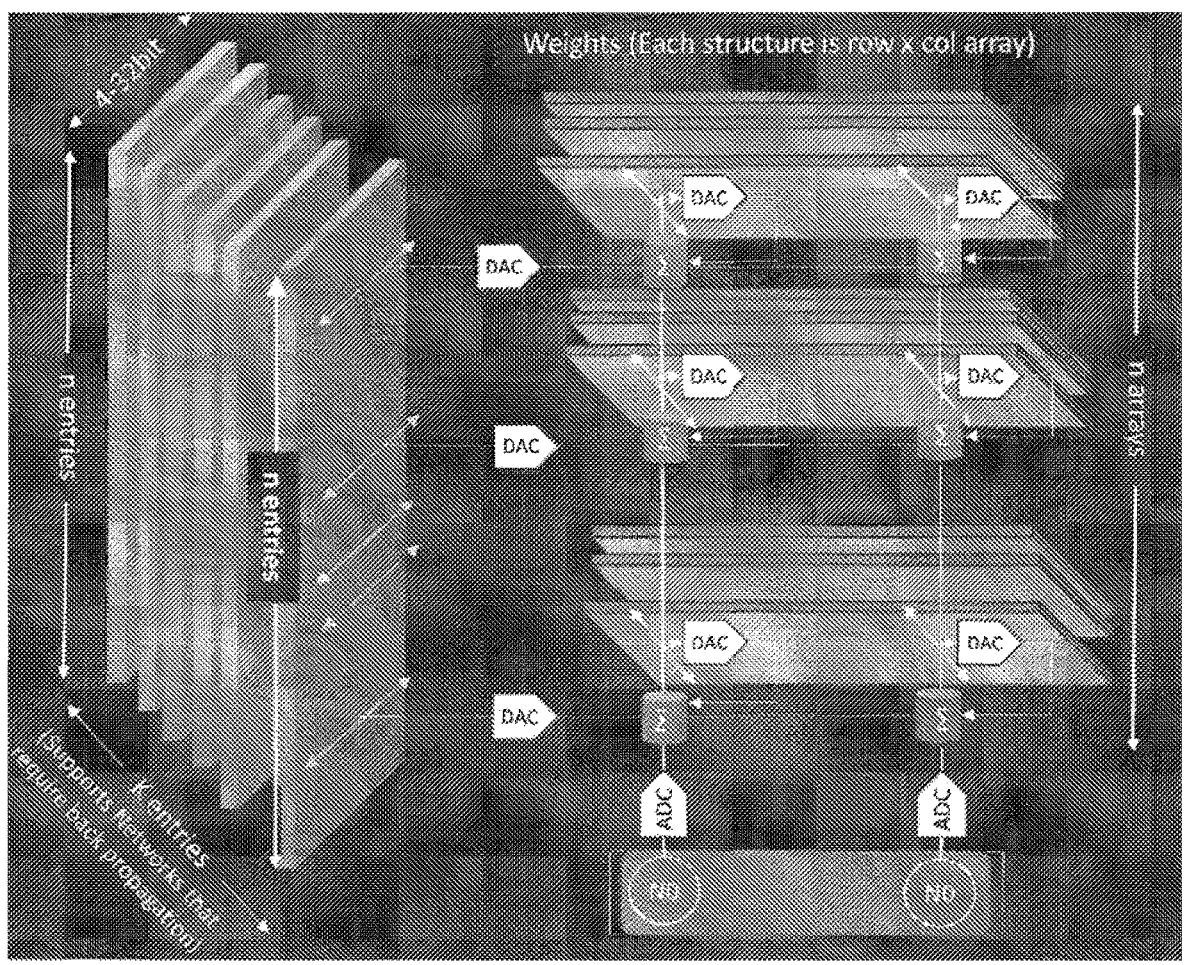
FIG. 4B illustrates a three dimensional representation of a matrix computation engine according to aspects of the present disclosure.

FIG. 4B illustrates a three dimensional representation of a matrix computation engine according to aspects of the present disclosure. In one approach, the SRAM can be configured to enable the matrix computation engines to compute a significant portion of a matrix in a single cycle. In another approach, the SRAM can be configured to enable the matrix computation engines to compute an entire matrix in one cycle. The matrix computations can be formulated and operated using vectors of input operands and weight operands. The vectors of input operands and vectors of weight operands may be stored in a manner that matches the structures of the SRAM and the matrix computation engines. Since each operand can be a vector of binary bits, each matrix operation is supported with arrays of binary bits. In other words, each input vector or weight vector is a vector of vectors. Thus, the analog matrix computation engines can be configured to execute entire matrix operation in one cycle, with a SRAM that is configured to feed arrays of input operands and weight operands in one cycle.

In some implementations, the SRAM can be configured to disburse multiple vectors of input operands and weight operands in parallel. Note that the memory structure of weight operands is also configured to facilitate MAC operations. In addition, memory or memory-like structures referenced above can be accessed by either an application processor or another custom or off-the-shelf processor embedded in the SoC.

Figure 5A:
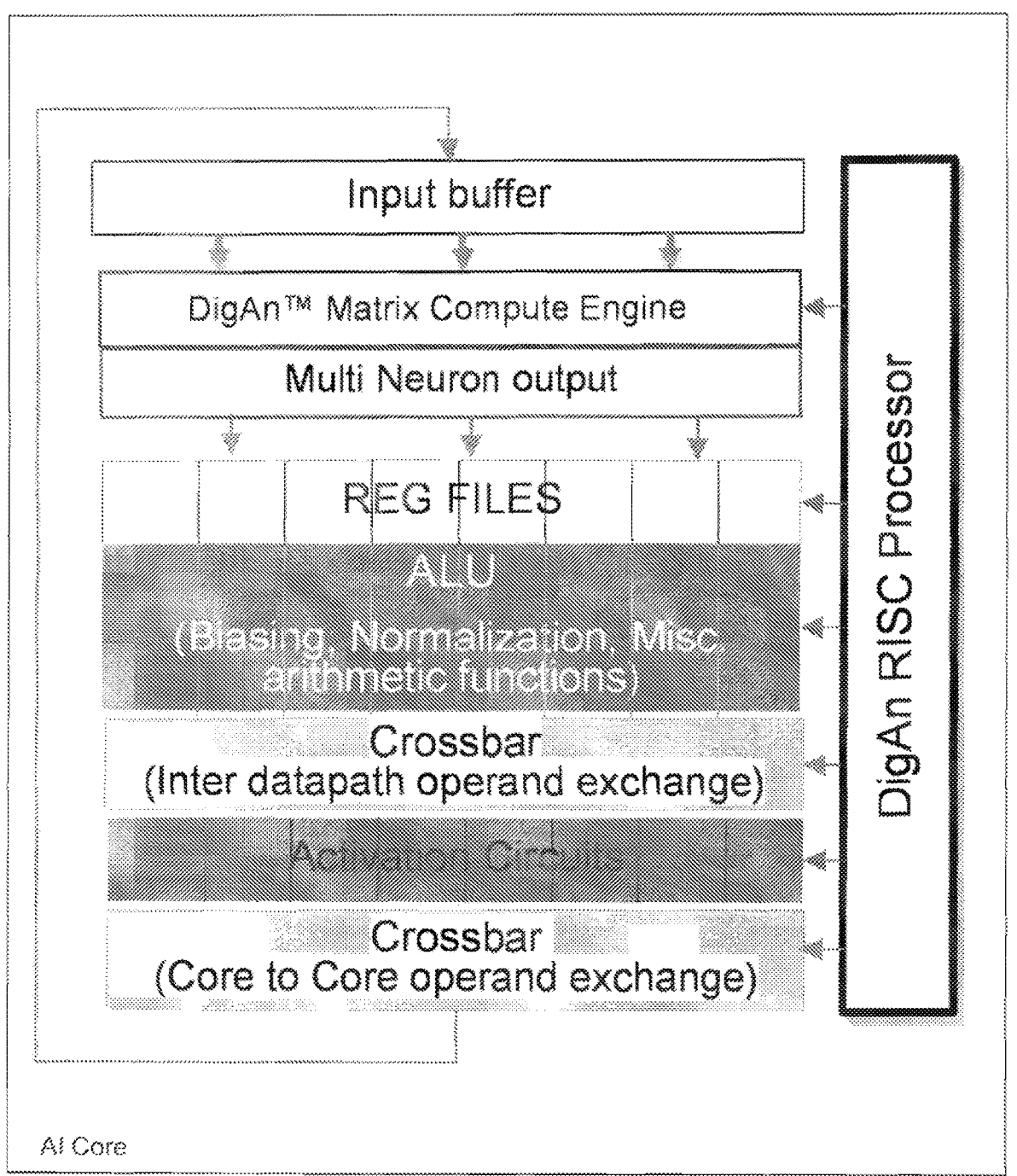
FIG. 5A illustrates an exemplary implementation of a matrix computation engine core according to aspects of the present disclosure.

FIG. 5A illustrates an exemplary implementation of a matrix computation engine core according to aspects of the present disclosure. In some implementations, each matrix computation engine, also referred to as an AI core, can be configured as a self-sufficient AI computer to implement software defined neural network algorithms. In addition to functioning as a matrix computation engine, the AI core may be configured to include other components that perform other digital functions. For example, the AI Core may include a RISC Processor. The AI core may be configured to perform biasing and normalization such as by an ALU. The AI core may also be configured to perform activation functions implemented using mixed signal techniques using custom circuits. Moreover, the AI core may include a second crossbar configured to distribute results from one AI core to other AI cores.

According to aspects of the present disclosure, the RISC Processor may be a custom RISC processor with custom ISA, which can be configured to perform composite SIMD instructions. It may include 1) custom IP blocks such as 3D SRAM to minimize overhead due to instruction execution; 2) eight simultaneous datapaths; 3) cross bar to exchange data between datapath slices; and 4) asynchronous handshake with matrix computation engines and operand memory for power reduction.

In some implementations, the AI core can further be configured to support interchangeable master-slave relationships. For example, a RISC engine can be configured to function either as a master or as a slave. The role can be changed dynamically via software control. In another example, in AlwaysON inference mode, the RISC engine may act as master and operate independently.

Figure 5B:
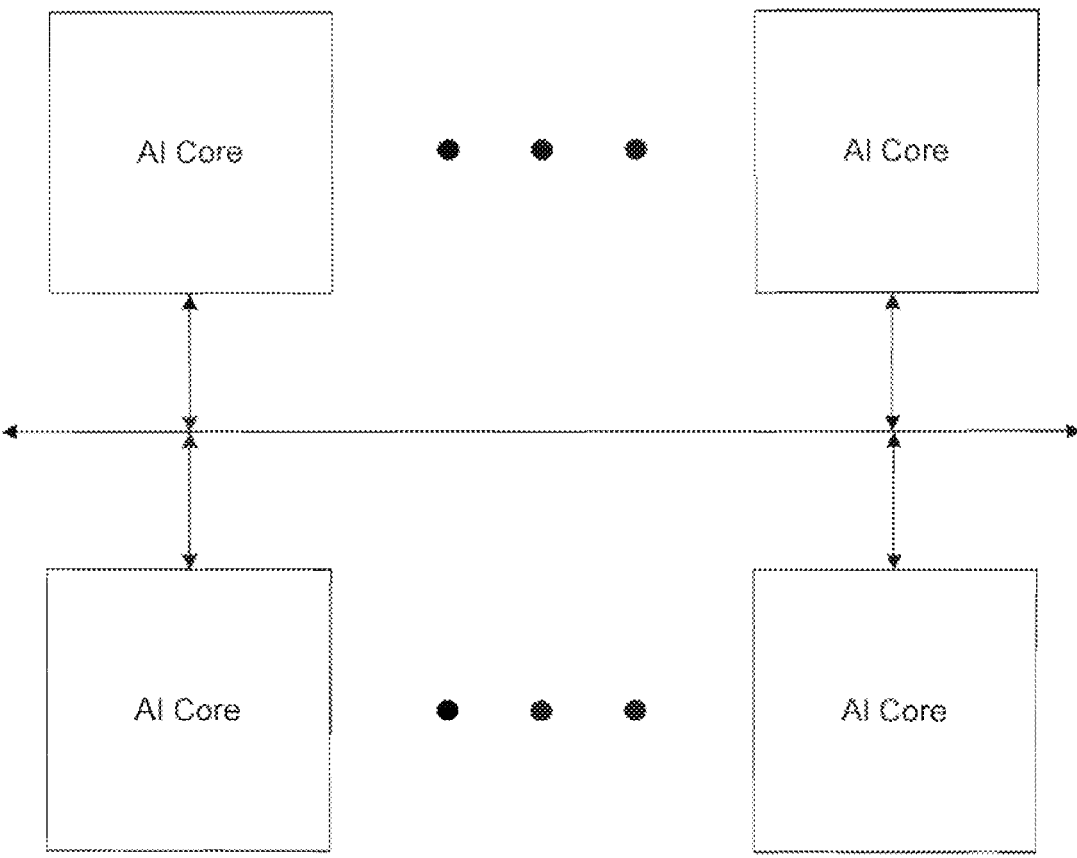
FIG. 5B illustrates an exemplary implementation of forming multiple matrix computation engine cores according to aspects of the present disclosure.

FIG. 5B illustrates an exemplary implementation of forming multiple matrix computation engine cores according to aspects of the present disclosure. In some implementations, the SoC can be configured to support neural network (NN) algorithms for various AI applications. It can be designed for both OnDevice Inference and OnDevice Training. The SoC can include multiple matrix computation engine cores (also referred to as AI cores), with an architecture that uses custom circuit components. The SoC can be configured to support dynamic character morphing of AI cores via software defined dynamic switching between On-Device training and inference at run time.

The SoC can further be configured to support flexible operand resolution, such as mix and match of 4 bit, 8 bit, 16 bit, 32 bit operands and operating structure. The exemplary SoC can achieve a system performance of 512 Giga operations per second (GOPS), and has a power efficiency of 4.3 TOPS with an exemplary 40 nm process. Note that the low power performance is achieved using custom circuit components along with multiple levels of power and clock gating techniques.

According to aspects of the present disclosure, each AI core can be configured to run instructions on demand. In other words, each AI core can be enabled, disabled or halted independently. Communications between the AI cores may be conducted through instructions. The AI cores may be configured to support both broadcast and point-to-point communication among cores. Code running in the RISC engine can be stalled and started by the application processor asynchronously. In some implementations, one clock may be configured to drive all AI cores, where various clock gating techniques are employed to reduce power consumption of the SoC.

The disclosed SoC may be used in a wide variety of applications. For example, the SoC may be used in voice and sound solutions for earbuds, smart personal assistants, headphones, and voice menu for remote controllers. In addition, the SoC may also be used in wearable devices, such as smart watches, smart shoes, body wear, and tags for pets or people. Using the techniques of sensor fusion, the SoC can be employed in bio watches, athletic analysis, behavior tracking, etc. Moreover, the SoC can be used in industrial or auto applications, such as predictive maintenance, automotive sensors, automation, appliances, etc. In particular, the SoC may be employed to perform control and analytics, such as menu voice commands, predictive maintenance, situational awareness, etc. Furthermore, the SoC may be used in embedded edge servers, cell tower edge servers, rack edge servers, etc.

FIG. 6 illustrates an exemplary method of performing neural network computation according to aspects of the present disclosure. As shown in FIG. 6, in block 602, the method selects one or more matrix computation circuits according to dimensions of a first matrix of a neural network and dimensions of a second matrix of the neural network. In block 604, the method configures an operand memory, comprising a first operand memory and a second operand memory, to communicate with the one or more matrix computation circuits. In block 606, the method issues a first instruction for fetching a first vector of operands from the first operand memory corresponding to a row from the first matrix and a second instruction for fetching a second vector of operands from the second operand memory corresponding to a column from the second matrix. In block 608, the method computes one or more outputs of the neural network using the row from the first matrix and the column from the second matrix. In block 610, the method repeats the fetching and computing procedures to process each row of the first matrix and each column of the second matrix to obtain the one or more outputs of the neural network.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method of performing neural network computation, comprising:

selecting, by a controller, one or more matrix computation circuits according to dimensions of a first matrix of a neural network and dimensions of a second matrix of the neural network;

configuring, by the controller, an operand memory, comprising a first operand memory storing rows of the first matrix as input vectors and a second operand memory storing columns of the second matrix as weight vectors, to communicate with the one or more matrix computation circuits, wherein the operand memory is configured to dynamically adjust operand resolution during runtime via software-defined instructions executed by cores within the matrix computation circuits;

issuing, by the controller, a first instruction for fetching a first vector of operands from the first operand memory corresponding to a row from the first matrix and a second instruction for fetching a second vector of operands from the second operand memory corresponding to a column from the second matrix;

converting, by digital-to-analog converters (DACs') integrated within the matrix computation circuits, the first vector of operands and the second vector of operands to analog variables;

computing, by the one or more matrix computation circuits, one or more outputs of the neural network using the row from the first matrix and the column from the second matrix in a single cycle using analog multiplication and accumulation (MAC) operations;

converting, by an analog-to-digital converter (ADC), the analog MAC result to a digital output; and repeating, by the controller, the fetching and computing procedures iteratively to process each row of the first matrix with each column of the second matrix to generate a complete output matrix of the neural network.

2. The method of claim 1, wherein converting the first vector of operands and the second vector of operands to analog variables comprises:

using a first digital-to-analog converter (DAC) to convert the first vector of operands to a current signal; and using a second digital-to-analog converter (DAC) to convert the second vector of operands to an analog signal that modulates conductance in matrix computation circuits.

3. The method of claim 1, wherein the analog MAC operations use Kirchhoff's law to perform the multiplication in analog.

4. The method of claim 1, wherein dynamically adjusting operand resolution includes selecting from 4-bit, 8-bit, 16-bit, or 32-bit resolutions independently for each core within the matrix computation circuits via software control.

* * * * *